United States Patent [19]

Chagawa et al.

[11] 4,022,072
[45] May 10, 1977

[54] SPROCKET DEVICE FOR USE IN A TRACK-TYPE TRACTOR

[75] Inventors: Chikashi Chagawa; Sumio Yoshinouchi, both of Hirakata, Japan

[73] Assignee: Kabushiki Kaisha Komatsu Seisakusho, Tokyo, Japan

[22] Filed: Apr. 15, 1976

[21] Appl. No.: 677,168

Related U.S. Application Data

[63] Continuation-in-part of Ser. No. 482,897, June 25, 1974, abandoned.

[30] Foreign Application Priority Data

Feb. 21, 1974   Japan .................... 49-20156[U]

[52] U.S. Cl. ................ 74/243 R; 74/243 DR; 74/243 PC; 74/229; 305/57
[51] Int. Cl.² .................. F16H 55/14; F16H 55/30
[58] Field of Search ..... 74/243 R, 243 FC, 243 PC, 74/443, 447, 243 DR, 229; 180/9.62, 9.64; 305/57

[56] References Cited

UNITED STATES PATENTS

| | | | |
|---|---|---|---|
| 2,003,528 | 6/1935 | Best | 305/57 |
| 2,492,219 | 12/1949 | Haefeli | 74/243 PC |
| 2,953,930 | 9/1960 | Meyer | 74/243 PC |
| 3,057,219 | 10/1962 | Montgomery | 74/243 PC |
| 3,231,316 | 1/1966 | Ruf | 305/57 |
| 3,576,352 | 4/1971 | Sato et al. | 74/243 PC |
| 3,578,822 | 5/1971 | Slemmons | 305/57 |
| 3,854,345 | 12/1974 | Reinsma | 74/443 |
| 3,889,550 | 6/1975 | Boggs et al. | 74/443 |

FOREIGN PATENTS OR APPLICATIONS

| | | | |
|---|---|---|---|
| 728,709 | 10/1942 | Germany | 305/57 |
| 1,145,948 | 3/1963 | Germany | 305/57 |
| 705,165 | 3/1941 | Germany | 180/9.1 |
| 720,092 | 4/1942 | Germany | 305/57 |
| 719,694 | 12/1954 | United Kingdom | 74/243 PC |

*Primary Examiner*—Samuel Scott
*Assistant Examiner*—Allan R. Burke
*Attorney, Agent, or Firm*—Armstrong, Nikaido & Marmelstein

[57] ABSTRACT

A sprocket device is provided in a track type tractor for driving endless tracks thereof. The device has a plurality of brackets fixedly secured to both side of the sprocket body along the periphery thereof at predetermined intervals, a plurality of buffer members, each being replaceably secured to each of the brackets, and plurality of frame members, each being secured to each of the brackets and including walls extending from the brackets parallel to and spaced from the side of the buffer members for preventing the buffer members from falling sideways. The frame member is coextensive with a portion of the sides of the buffer members. Thus, the endurability of the buffer members is much improved.

6 Claims, 4 Drawing Figures

SPROCKET DEVICE FOR USE IN A TRACK-TYPE TRACTOR

CROSS REFERENCE TO RELATED APPLICATION

This application is a continuation-in-part application of our prior U.S. patent application Ser. No. 482,897 filed June 25, 1974, now abondoned, entitled "SPROCKET FOR USE IN TRACTOR".

BACKGROUND OF THE INVENTION

This invention relates to a sprocket device for driving endless tracks of a track type tractor.

Heretofore, there is known a sprocket device to which is fixed an annular rubber member engaging with a link thereof so as to reduce the level of noise generated when the sprocket is engaged with the link.

Howeve, since the above mentioned rubber member is merely fixed directly to the sprocket, the rubber member tends to fall when it is brought into contact with the link so that the rubber is worn in a very short time. Also since the rubber member is formed in a single unit, it is very troublesome to replace.

SUMMARY OF THE INVENTION

It is, therefore, an object of the present invention to provide a sprocket device for use in a track type tractor in which the endurability of the buffer member is improved.

It is another object of the present invenion to provide a sprocket device for use in a track type tractor in which its buffer member can be easily replaced.

BRIEF DESCRIPTION OF THE DRAWINGS

These and other objects, features and advantages of the sprocket device for use in a track type tractor, according to the present invention, will become more apparent from the following description taken in conjunction with the accompanying drawings, in which.

DETAILED DESCRIPTION OF THE PREFERRED EMBODIMENTS

Figure 1:
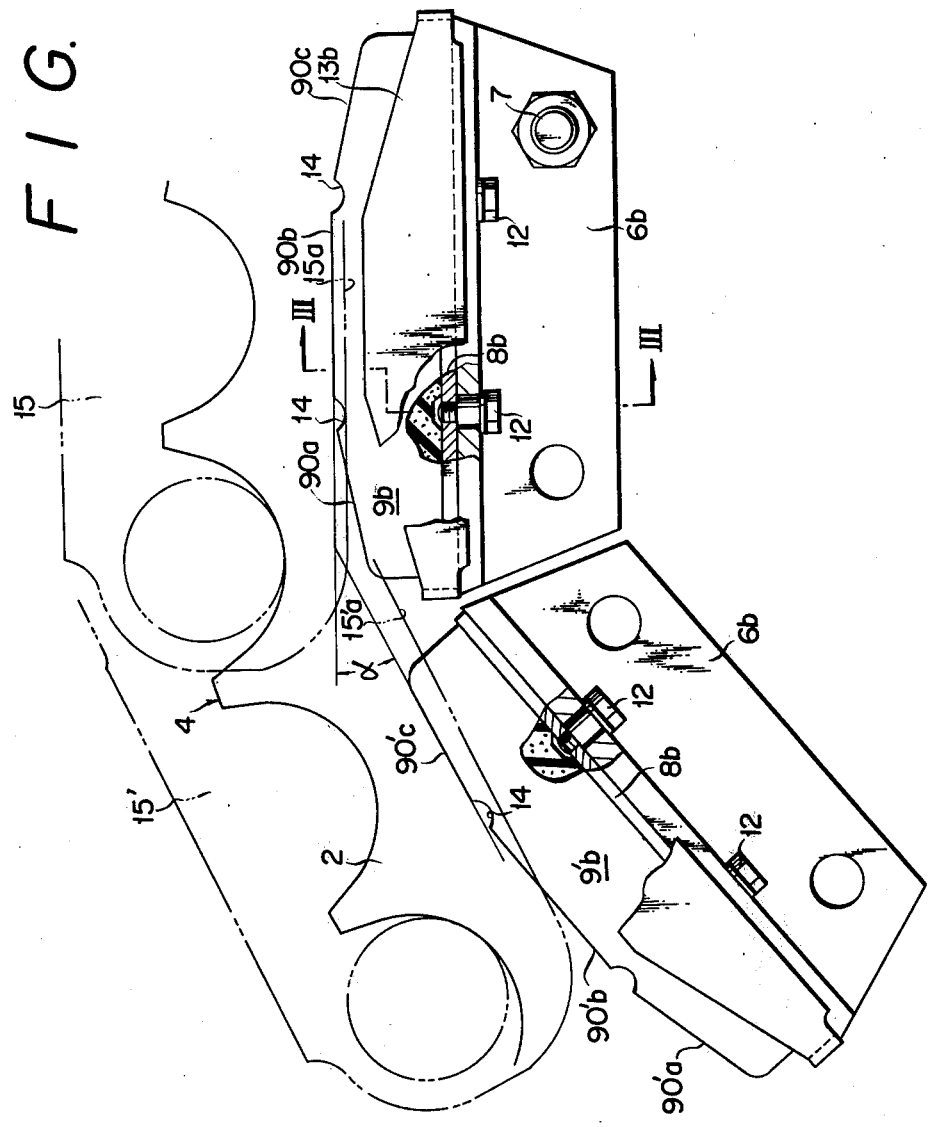
FIG. 1 is a front view of the sprocket device for use in a track type tractor according to one embodiment of the present invention.
Figure 2:
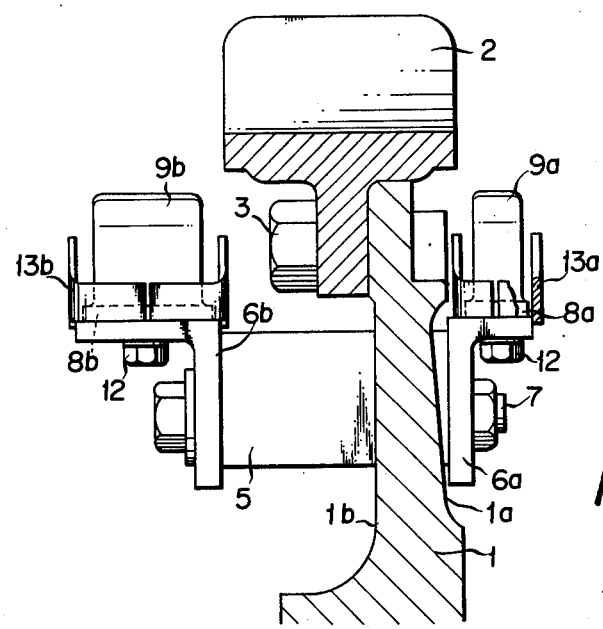
FIG. 2 is a diametrical sectional view of the sprocket device of the present invention shown in FIG. 1.
Figure 3:
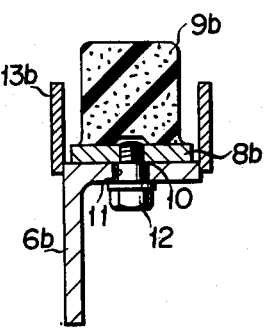
FIG. 3 is a partial cross sectional view of the sprocket device taken along a line III — III in FIG. 1.

Reference is now made to FIGS. 1 to 3, which show one embodiment of the sprocket device of the present invention, numeral 1 represents a sprocket body. Along the periphery of the sprocket body 1 a plurality of arcuate tooth units 2 are detachably secured in a continuous manner to the sprocket body 1 by means of bolts 3 so that an annular gear portion 4 is formed on the outer periphery of the sprocket body 1. A plurality of mounting members 5 are fixedly welded to both sides faces 1a and 1b of the sprocket body 1 at predetermined intervals along the periphery thereof. Plural pairs of first and second L-shaped brackets 6a and 6b are respectively secured to both end faces of the mounting members 5 by means of a plurality of bolt and nut assemblies 7. A plurality of first buffer members 9a rest on a plurality of first mounting plates 8a, while a plurality of second buffer members 9b rest on a plurality of second mounting plates 8b. Each of the first buffer members 9a is replaceably secured to each of the first brackets 6a on one side of the sprocket body 1, while each of the second buffer members 9b is replaceably secured to each of the second brackets 6b on the other side of the sprocket body 1. The width of each of the first buffer members 9a is less than the width of each of the second buffer mmembers 9b. This permits the width of the endless track of a track type tractor to be reduced, thereby reducing the production cost of the tractor. Each of the mounting plates is detachably secured to each of the brackets by screwing a bolt 12 inserted into a threaded hole 10 formed in each of the mounting plates passing through a hole 11 formed in each of the brackets. A first rectangular frame member 13a is secured to each of the first brackets 6a and includes walls extending from the first brackets 6a parallel to and spaced from the side of the first buffer members 9a for preventing the buffer members from falling sideways. As is similar to this, a second rectangular frame member 13b is also secured to each of the second brackets 6b and includes walls extending from the second brackets 6b parallel to and spaced from the side of the second buffer members 9b for the same purpose as the first frame member 13a. The respective frame members are coextensive with a portion of the sides of the buffer members. By being parallel to sides of the buffer member, each of the brackets prevents each of the buffer members from being bent toward the side by a substantial amount, thereby enhancing the endurability of the buffer members. On the other hand, the spacing of the brackets from the sides of the buffer members allows for some deformation of the buffer member in a direction toward the brackets as a result of compression when the buffer members come in contact with link members 15 of the endless track of the track type tractor. Allowing for the deformation due to compression further enhances the endurability of the buffer members.

The outer surface 90 of each of the first and second buffer members 9a and 9b has such a configuration as comprising three substantially flat surface parts 90a to 90c and semi-circular recesses 14 respectively formed between the surface parts 90a and 90b and between the surface parts 90a and 90c. The surface parts 90a to 90c successively come into contact with each of the links of the endless track. Between the respective surface parts 90a to 90c of a buffer member 9b and the surface parts 90'a to 90'c of adjoining buffer member 9'b there is the following relation.

For example, the surface part 90b of the buffer member $9a_1$ is in parallel to the inner surface 15a of the link 15, while the surface part 90'c of the buffer member $9a_2$ is in parallel to the inner surface of the adjoining link 15', wherein an angle defined by and between the surface parts 90b and 90'c corresponds to the winding angle of the respective links against the sprocket body 1. Thus, each buffer member successively come in contact with the inner surface of each link at the substantial whole outer surface thereof in a plane contact manner. Therefore, a surface pressure applied on the respective surface part of each buffer member is remarkably reduced. Further, when each of the surface parts of the buffer member successively comes into contact with the inner surface of the link, the buffer member can easily deform by the action of the recesses 14 not only in the radial direction thereof but also in the circumferential direction thereof without receiving any breakage.

In addition, when the sprocket is engaged with link 15, each of the surface parts of the buffer member is successively brought into contact with the respective inner surface of the links so as to reduce the level of noise generating thereat.

When the buffer member is worn down, the bolt 12 is loosened from the bracket, and then the buffer member 9 is again held to the bracket 6 by means of the bolt 12 after interposing a spacer between the mounting plate and the bracket, the outer surface of the buffer member is heighten so as to obtain the buffering effect again.

It will be understood from the foregoing that since the sprocket according to the present invention is thus constructed, the noise generated when the sprocket is engaged with the link can be prevented. It will also be understood that since the sideways falling of the buffer member when the member is brought into contact with the linkk can be prevented by the frame, the abnormal wear down of the buffer member due to the sideways falling thereof may be prevented, thereby improving the endurability thereof. In addition, It will also be understood that since the buffer member is split into units and yet each unit is fixedly secured through each bracket along the periphery of the sprocket body, the buffer member can be easily replaced.

Figure 4:
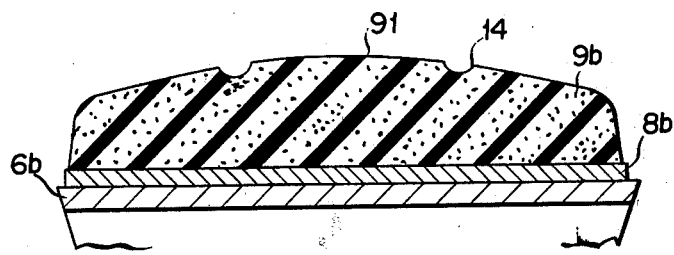
FIG. 4 is a fragmental and partially longitudinal cross sectional view showing the buffer member in accordance with another embodiment of the sprocket device of the present invention.

Further, in FIG. 1, the longitudinal length of the buffer member is defined in relation to the number of teeth and the diameter of the sprocket. Accordingly, it is generally impossible to arrange a plurality of buffer members, each having the same length, around the sprocket. In practice, at least one buffer member having a odd length has been used. However, this is a disadvantage in the management of parts. Therefore, in order to eliminate this disadvantages, the present invention provides another embodiment of the sprocket in which the outer peripheral surface of the buffer member is the surface 91 having circular arc in its section as shown in FIG. 4. The longitudinal length of such buffer member can be defined without having connection with the number of teeth of the sprocket. But a radius of curvature of the circular arc is defined by the diameter of the sprocket.

What is claimed is:

1. A sprocket device for driving an endless track of a track-type tractor comprising:
    a. a plurality of first and second brackets fixedly secured to both sides of a sprocket body, respectively, along the periphery of the sprocket body at predetermined intervals
    b. a plurality of first buffer members each being replaceably secured to each of said first brackets on one side of said sprocket body and a plurality of second buffer members each being replaceably secured to each of said second brackets on the other side of said sprocket body wherein the width of each of said first buffer members is less than the width of said second buffer members, and
    c. first and second frame means respectively secured to said first and second brackets and each of said frame means including walls extending from each of said brackets parallel to and spaced from the sides of each of said buffer members for preventing said buffer members from falling sideways wherein each of said frame means is coextensive with a portion of the sides of said buffer members, whereby noise generated when the sprocket device is engaged with links of said endless track is eliminated and the endurability of said buffer members is remarkably improved.

2. A sprocket device as claimed in claim 1, wherein the outer peripheral surface of each of said first and second buffer members comprises three substantially flat surface parts which successively come into contact with the inner surface of the link of said endless track in a plane contact manner and semi-circular recesses formed between either two surface parts of said three surface parts wherein the buffer member is capable of allowing for some deformation in the peripheral direction thereof, thereby further enhancing the endurability of the buffer members.

3. A sprocket device as claimed in claim 1, wherein each of said buffer members is replaceably secured through a mounting plate thereof to each of said brackets by means of screws passing through said bracket and threadingly inserted into said mounting plate.

4. A sprocket device as claimed in claim 1, further comprising a mounting member of which each of said first and second brackets is detachably secured to both sides thereof by means of bolt and nut assembly, said mounting member being fixedly secured to the sprocket body.

5. A sprocket device as claimed in claim 1, further comprising a plurality of detachable tooth units which are continuously held in the periphery of the sprocket body by means of bolts so as to form an annular gear part on the outer periphery of the sprocket body.

6. A sprocket device as claimed in claim 2, wherein said outer peripheral surface of the buffer members has a substantially arcuate shaped longitudinal section.

* * * * *